July 2, 1957 H. SWANLUND 2,797,784
SAFETY COUPLING
Filed Jan. 18, 1955 2 Sheets-Sheet 1
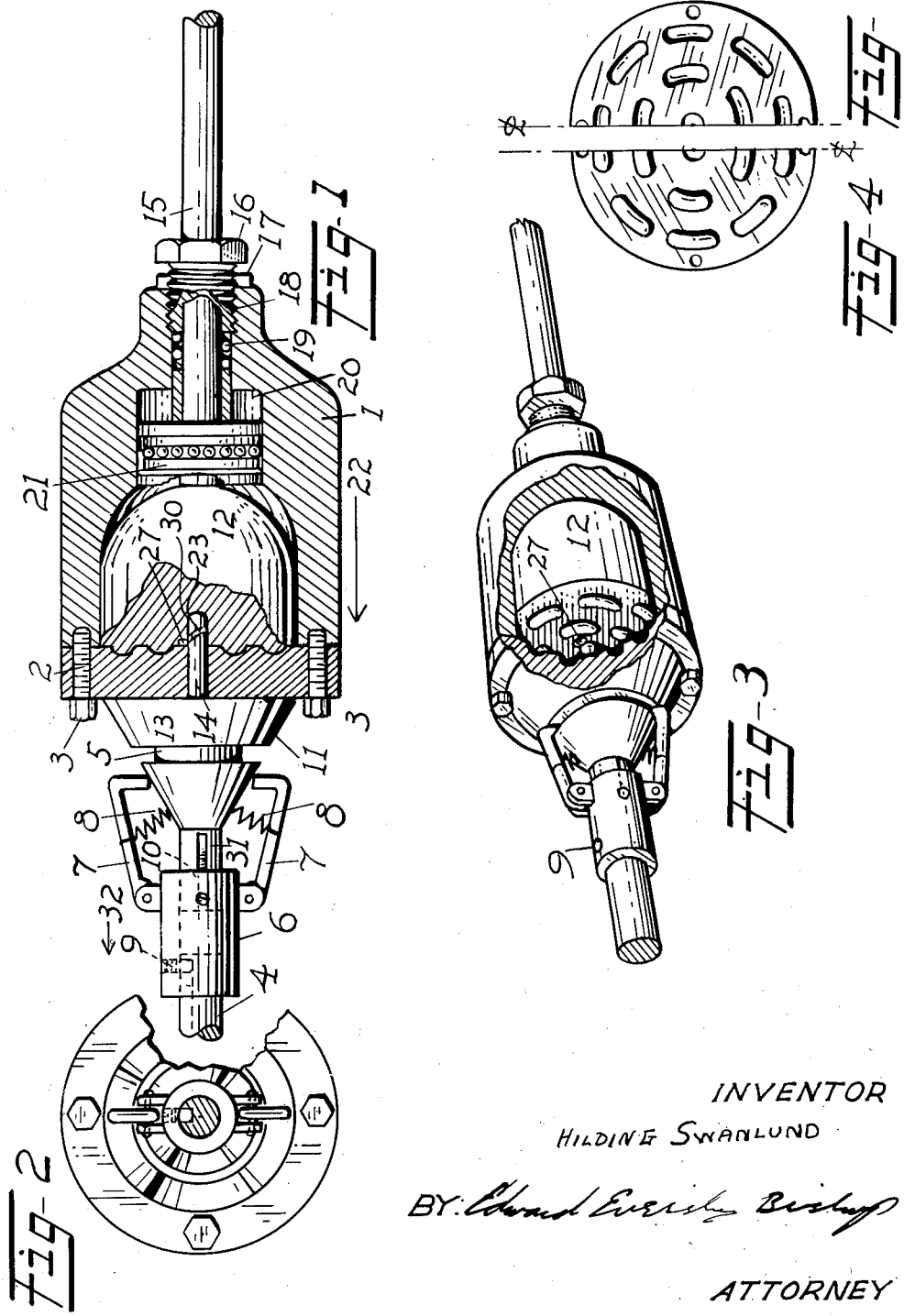
INVENTOR
HILDING SWANLUND
BY Edward Everisly Bishop
ATTORNEY July 2, 1957     H. SWANLUND     2,797,784
SAFETY COUPLING
Filed Jan. 18, 1955     2 Sheets-Sheet 2
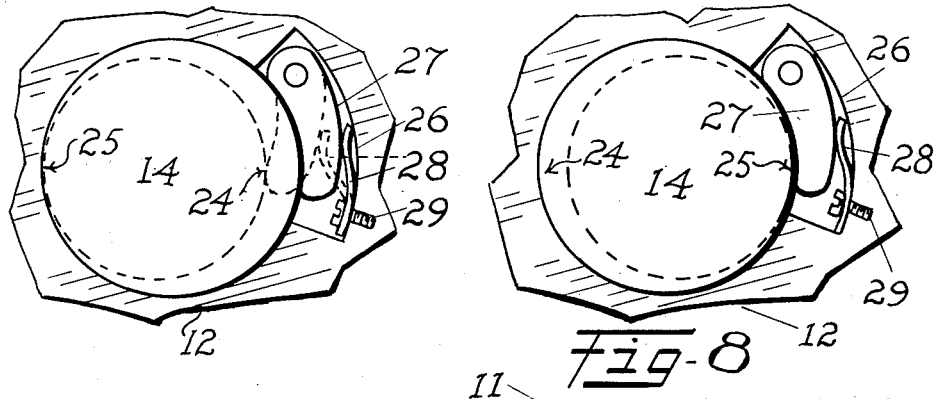
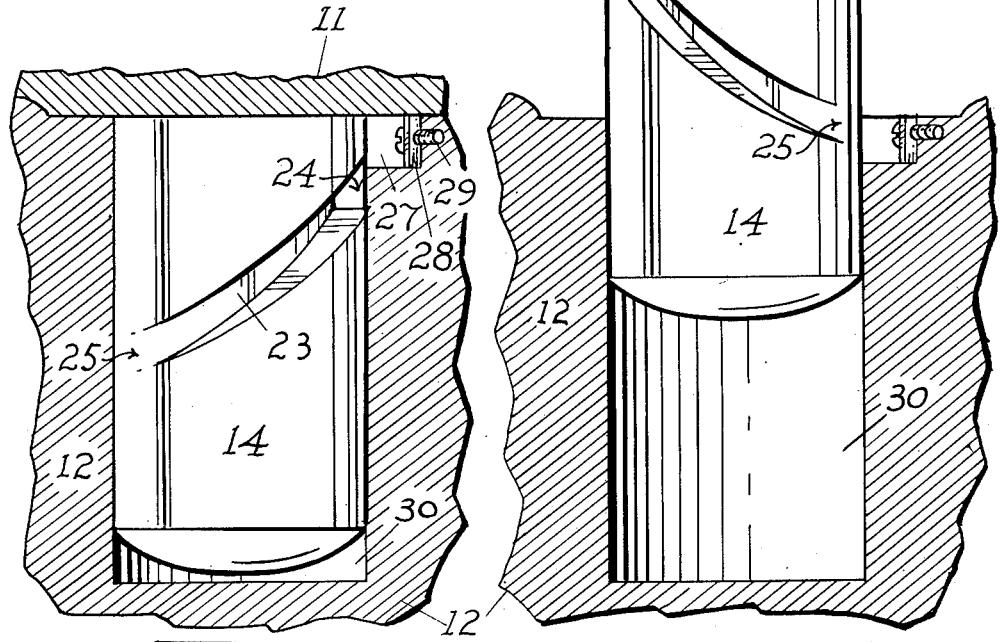
INVENTOR
HILDING SWANLUND
BY
ATTORNEY

United States Patent Office 2,797,784
Patented July 2, 1957

2,797,784

SAFETY COUPLING

Hilding Swanlund, Edmonton, Alberta, Canada

Application January 18, 1955, Serial No. 482,588

2 Claims. (Cl. 192—56)

This device relates generally to clutches or couplings and more particularly to a safety type of clutch which is adapted to release or disengage upon excessive resistance or overload.

The prime object of this device is to provide a safety clutch that will disengage automatically upon excessive resistance or overload and that does not use any form of shear pin or the like that is broken when the clutch disengages.

An additional object is to provide a safety clutch that may be reversed at will without necessitating any change to the clutch mechanism.

A further object is to provide a safety clutch having a manual adjustment wherein the clutch may be utilized with machinery having a wide range of powers and speeds.

A still further object is to provide a safety clutch that may be re-engaged with a minimum of time and effort.

Additional objects and advantages of my device will become apparent to those skilled in the art on reading the following specification in the light of the attached drawings. It must be understood that the information disclosed therein is by way of example and illustration only and is not to be construed as a limitation. The invention herein is to be limited only by the terms of the appended claims and by the prior art.

In the drawings illustrating one preferred embodiment of my idea:

Figure 1 is a side elevational view of my device partly in section and partly broken away to illustrate more clearly the construction thereof.

Figure 2 is an end view of my clutch again partly broken away.

Figure 3 is an isometric view of my clutch again partly broken away and in section to illustrate the construction thereof.

Figure 4 is a view illustrating one-half of the drive engaging face.

Figure 5 is a view illustrating one-half of the driven clutch engaging discs.

Figure 6 is a broken away end view of the stub shaft and engaging pawl.

Figure 7 is a broken away elevation of the stub shaft illustrating the shaft groove.

Figure 8 is a broken away end view similar to the view shown in Figure 6 but rotated 180 degrees with respect thereto.

Figure 9 is a broken away elevation of the stub shaft in the position illustrated in Figure 8 and moved out of the position illustrated in Figure 7.

With reference now to the drawings there will be seen the hollow driving member which consists of the main body 1 which has fixed thereto the cap 2 by the stub bolts 3. The cap 2 is formed into the cone 11 and stub shaft 31 and has the peripheral groove 5 located substantially midway the length of the cone. The drive shaft 4 is provided with the collar 6 fixed on the drive shaft by the set screw 9 and mounting the latches 7—7 which are spring loaded by the tension springs 8—8. The collar 6 is provided also with the spline 32 which engages in the groove 10 in the stub shaft 31 when fitted together as illustrated in Figure 1 in the drawings.

The driven member of this device comprises the dome shaped member 12 and shaft 15 mounted slidably within the main body 1 and adapted at its forward end to provide a clutch face to mate with the inner clutch face of the cap 2 as is designated by the numeral 13 in Figure 1 in the drawings. The dome shaped member 12 is supported at its forward end by the counterbore 30 which fits slidably on the stub shaft 14 and at its opposite end along the shaft 15 by the tension adjustment nut 16 which is engaged threadably on the internal threads 18 in the main body 1.

The stub shaft 14 is provided with the groove 23 which is in the form of two opposed helical curves with the most deeply incized part of the groove being at the intersection 24 of the curves and becoming gradually shallower until intersecting at 25 at the opposite side of the shaft 14. It will be noted that the curves, at the intersection 25, merge with the exterior of the shaft 14.

The recess 26 is provided in the mating face of the member 12 and contains the pawl 27 which is spring loaded by the spring 28. The spring 28 is fastened securely by means of the fastening screw 29.

Tension between the faces on the dome shape member 12 and the cap 2 is maintained by the tension spring 19 which acts through the collar 20 and the pressure bearing 21 against the dome shaped member 12. Obviously the tension of the spring 19 may be increased or decreased as is desired by the manipulation of the tension adjustment nut 16.

In operation the drive shaft 4 would be coupled to a source of suitable power and the shaft 15 would be coupled to the machinery to be driven. With the tension adjustment nut 16 correctly adjusted to maintain the proper friction between the meeting face of the dome shaped member 12 and the inner face of the cap 2 there would be power transmitted from the power source through the mated faces 13 to the shaft 15. However, whenever the load through the shaft 15 exceeds the safety limit as dictated by the adjustment of the tension adjustment nut 16, the mated faces of the dome shaped member 12 and cap 2 will disengage and the main body 1 will move in the direction indicated by the arrow 22. Movement of the main body 1 in the direction of the arrow 22 will bring the pawl 27 into coincidence with the deep portion 24 of the groove 23 and continued rotation of the main body 1 will force the mated faces sufficiently apart to allow the spring loaded latches 7 to engage in the groove 5 in the cone 11 and maintain the faces in the disengaged position until the load on the shaft 15 can be reduced to a safe limit. When in the disengaged position, it will be obvious that the main body 1 will rotate freely around the dome shaped member 2 and since the faces are disengaged there will be no power transmitted through the shaft 15. Once the load on the shaft 15 has been reduced to safe limits, the spring loaded latches 7 may be disengaged from the groove 5 and the main body 1 rotated relative to the dome shaped member 12 to bring the mating faces once again into contact. Once this has been done power may then be applied through the shaft 4 to the shaft 15.

What I claim as my invention is:

1. In a safety coupling for coupling a drive shaft to to a driven shaft, a hollow driving member having a telescoping driving connection with the said drive shaft, a clutch face in the driving member, a stub shaft projecting from the clutch face, a driven member within the driving member mounted rotatably at one end to the said stub shaft and connected at its opposite end to the said driven shaft, a clutch face on the driven member adapted to mate with the clutch face in the driving member and spring means reactable between the driving and driven members to maintain the clutch faces together, means on the stub shaft adapted to force the clutch faces into complete disengagement when the driven member meets with resistance and spring loaded latches on the drive shaft adaped to engage with the driving member to maintain the driving member in the disengaged position with respect to the driven member.

2. The safety coupling as claimed in claim 1 wherein the means on the stub shaft adapted to force the clutch faces into complete disengagement comprises a helical groove in the shaft and a spring loaded pawl on the driven member adapted to engage with the helical groove.

No references cited.